US005459305A

United States Patent [19]

Eriksson

[11] Patent Number: 5,459,305

[45] Date of Patent: Oct. 17, 1995

[54] METHOD AND SYSTEM FOR DECENTRALIZED INDIVIDUAL ATTENDANCE DATA AND CONTROL

[76] Inventor: Lennart Eriksson, Slåttervägen 80, S-135 42 Tyresö, Sweden

[21] Appl. No.: 50,469

[22] PCT Filed: Sep. 18, 1992

[86] PCT No.: PCT/SE92/00650

§ 371 Date: May 18, 1993

§ 102(e) Date: May 18, 1993

[87] PCT Pub. No.: WO93/06568

PCT Pub. Date: Apr. 1, 1993

[30] Foreign Application Priority Data

Sep. 20, 1991 [SE] Sweden .................................. 9102739

[51] Int. Cl.$^{6}$ ........................................ G06K 5/00

[52] U.S. Cl. .............................. 235/382; 235/384

[58] Field of Search .................................. 235/382, 492, 235/384

[56] References Cited

U.S. PATENT DOCUMENTS

| | | | |
|---|---|---|---|
| 4,501,958 | 2/1985 | Glize | 235/382 |
| 4,555,618 | 11/1985 | Riskin | 235/384 |
| 4,650,978 | 3/1987 | Hudson et al. | 235/380 |

FOREIGN PATENT DOCUMENTS

| | | |
|---|---|---|
| 0061373 | 9/1982 | European Pat. Off. . |
| 0104767 | 4/1984 | European Pat. Off. . |
| 0159539 | 10/1985 | European Pat. Off. . |
| 1-237778 | 9/1989 | Japan . |
| 2-88860 | 3/1990 | Japan . |
| 2-88861 | 3/1990 | Japan . |
| 3-8094 | 1/1991 | Japan . |

*Primary Examiner*—Donald Hajec
*Assistant Examiner*—Karl D. Frech
*Attorney, Agent, or Firm*—Nies, Kurz, Bergert & Tamburro

[57] ABSTRACT

A monitoring method, such as time and/or passage monitoring method, in which individuals, such as physical persons, make contact with a stamping unit and therewith supply information to the unit, in which the information is preferably compiled. The method is mainly characterized by arranging existing units in a decentralized system in which each unit is separated physically from remaining units; and is further characterized in that each individual himself carries an updatable information carrier which includes unique information personal to the individual concerned, wherein updating of the information carrier can be effected upon contact with a stamping unit. The invention also relates to a system for carrying out the method.

16 Claims, 1 Drawing Sheet

METHOD AND SYSTEM FOR DECENTRALIZED INDIVIDUAL ATTENDANCE DATA AND CONTROL

Figure 1:
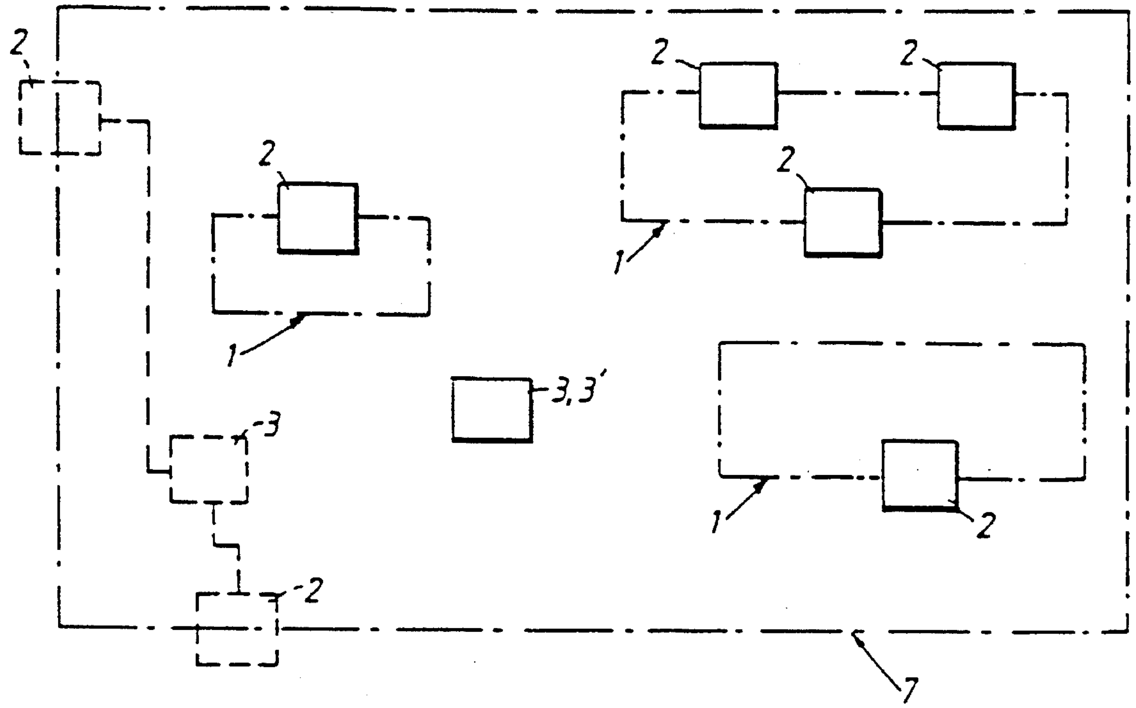

The present invention relates to a monitoring method for effecting time and/or passage checks for instance, in which individuals, such as physical persons, by contact with a so-called stamping unit (information exchange unit), supply information to said unit in which the information is preferably compiled.

The invention also relates to a system for carrying out the method.

Methods and systems essentially of this kind are known to the art. Two principal types of such systems exist.

A first of these systems includes a stamping (information exchange) machine, in which all persons clock-in and clock-out, so as to record the times at which such persons come and go. This system has a number of natural limitations, such as the number of persons clocking in and out, local systems which exclude the possibility of clocking in and out on some other machine or at some other place, reliability in operation, etc. These systems often consist of one single unit which integrates the stamping or clocking mechanism and calculating computer. A documentation printer or writer is normally connected to this unit. Person identification is normally effected with the aid of CR-80 cards provided with a magnetic strip. This type of identification process also applies to passage control systems for a lone door.

The other type of system referred to includes several stamping (information exchange) stations where people clock in and out, these stamping stations being mutually connected by means of a physical cable or by radio links, for instance. Although such systems overcome some of the drawbacks encountered with the first type of system, the cost of the cabling and of system maintenance is normally very high. Furthermore, the system requires the central equipment to be always dimensioned for the correct volumes of active features of the system, schedules, storage capacity for the numbers clocking in and out, etc. The system is comprised of a plurality of free-standing stamping or registering units which are connected to a central computer. In turn, this computer is normally connected to a personal computer in which the final computations are made and information is presented. The centrally-controlled passage monitoring system suffers precisely the same problems as the other type of system.

Thus, the known systems always have given limitations and when obtaining the system, the user must determine both structure and volumes. Although the user is able to change both structure and volumes after making the system operational, each change results in further volume limitations, while a change in the structure of the system may, in certain cases, result in a totally new system structure.

Due to installation/cabling costs, the cost of an existing system in which the user is able to "clock" in and out at several stations is very high. If, in addition, the user utilizes high memory storage volumes in the system, the costs will be still higher.

The present invention provides a method and system of relatively low cost, high flexibility, etc., and solves the aforementioned problems.

The invention thus relates to a monitoring method, such as a time and/or passage control method, where individuals, such as physical persons, make contact with a stamping unit and supply information to said unit, in which the information is preferably compiled.

The method is mainly characterized in that existing units are arranged in a decentralized system in which each unit is separated physically from remaining units; and in that unique information relating to an individual is carried by the individual himself/herself in the form of an updatable information carrier, where updating of the information can be effected upon contact with the stamping unit.

The invention also relates to a monitoring system, such as a time and/or passage control system, comprising at least one stamping unit to which information is supplied by individuals, such as physical persons, by contact with the stamping unit, wherein means are preferably provided for compiling the information.

The system is mainly characterized in that existing stamping units are arranged in a decentralized system, in which each unit is separated physically from remaining units of the system; and in that the system further includes individual updatable information carriers by means of which respective individuals themselves carry their own unique information, wherein updating of said information is intended to be effected upon contact with a stamping unit, which is intended to carry out said updating.

Figure 2:
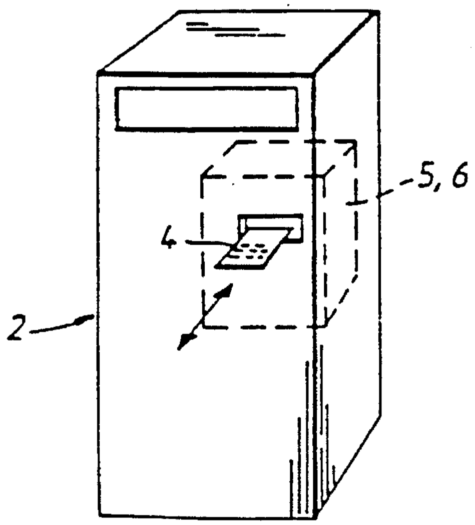
Figure 3:
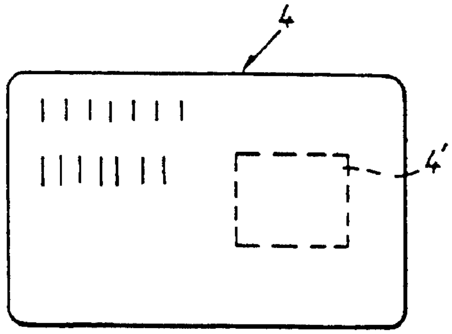

The invention will now be described in more detail with reference to exemplifying embodiments thereof and also with reference to the accompanying drawing, in which FIG. 1 is a block schematic illustrating a first exemplifying embodiment of an inventive system;

FIG. 2 illustrates-schematically a stamping unit constructed in accordance with the invention; and FIG. 3 illustrates schematically an information carrier in the form of a so-called smart card, in accordance with the invention.

Shown in FIG. 1 is a time and/or passage monitoring system 1 which includes a stamping unit 2 (a unit for exchange or information) to which information is supplied by individuals, such as physical persons, so as to record the times at which respective individuals arrive and leave, by contact with a stamping unit. The word contact shall be interpreted here as meaning both physical contact and also contact via a contactless technique. The word individual, as used here, shall also be given a wide interpretation and may include physical persons, groups of physical persons, such as a company department or the like, and juridical persons, among others. Existing stamping units 2 are arranged in a decentralized system 1, where each unit 2 is separated physically from remaining units of the system. The embodiment illustrated in FIG. 1 comprises three decentralized systems 1, where two of said systems each has a single stamping unit and one of the systems has three stamping units. Each stamping unit is thus a free-standing unit and the units are not connected together (to several stamping units) or to any form of central unit 3, when such a unit is included.

The term stamping unit shall also be given a wide interpretation and shall not be considered limited to units in which physical stamping of an information carrier takes place, but shall be interpreted to include all types of units via which an individual is able to exchange information with the system, i.e. via card readers, contactless systems, etc.

The reference 4 identifies an updatable information carrier which carries information which is unique to an individual, in appropriate cases to a person, and which is updated upon contact with a stamping unit 2 intended to effect such updating.

According to preferred embodiments, the information carrier 4 has the form of a readable and writable data medium 4, such as a smart card 4, shown in FIG. 3, a tag, a key or some like article. The smart card 4 or some corresponding essentially known device includes a memory and a data processing device 4' which can be activated in a known manner and which can thus be read and further information added thereto, either in the form of supplementary information or as an alteration to existing information, such as a passage code, arrival and leaving times, attendance compilation and other forms of balance. The stamping unit includes devices 5 of an essentially known kind by means of which the smart card or corresponding device is activated, updated, etc.

According to preferred embodiments, a stamping unit 2 will include a calculating unit 6 for processing desired information, preferably when an individual makes contact with the stamping unit through the intermediary of an information carrier. Such processing may include calculating the attendance balance, checking passage authorization with the aid of codes, etc.

According to one embodiment, the information carrier 4 is therefore intended to carry personal attendance information and to be updated by a stamping unit 2 when the person concerned makes contact with the stamping unit as said person comes and goes. It is often preferred that the information carrier will also carry information concerning passage authority or like information.

Preferred embodiments of the invention will also include a reader 3' which is intended to read information carried by an information carrier and preferably to deliver this information to a central processor. This reading of the information carried on the information carrier may be effected once a month or at other desired times when the attendance balance is determined by the wages or salary department.

According to one embodiment, shown in FIG. 1, the decentralized system 1 comprising stamping units 2 forms part-of a centralized system 7, wherein the centralized system is intended to adapt the information carried by the information carrier 4 to the decentralized system 1. In the case of this embodiment, the centralized system includes three decentralized systems, two stamping units 2 and a central unit 3. According to one preferred embodiment, the centralized system 7 and the decentralized system 1 may be arranged for passage control, wherein the centralized system includes a barrier or boundary structure and wherein one or more decentralized systems are disposed within this barrier or boundary. By barrier or boundary is meant here a physical boundary, such as a building, a physical enclosure or some like structure. Decentralized systems that are included by the centralized system may also be located outside the boundary. One example of such systems is a local office situated in a town or city other than where the boundary exists.

The inventive method and the *modus operandi* of the inventive system will be understood in all essentials from the aforegoing. Thus, the system is a decentralizing system in which none of the stamping units is in contact with another stamping unit or with any central unit that may be included, either by cable or by any other means. Unique personal information is carried within the system by means of a readable and writable personal information carrier, such as a smart card for instance.

By combining the decentralized system with a centralized system, the personal data of an individual can be changed by a central computer without the individual concerned needing to change his/her normal routines. One example in this respect is a passage monitoring system in which the boundary structure is a centrally-controlled system and an internal zone construction is a decentralized system. Upon passage through the boundary structure, the conditions for further internal passage of an individual are changed, or alternatively only the number of passages/time stamps are checked. This structure is highly suitable to a main office/local office combination where one office constitutes a central system and the other office constitutes a decentralized system.

It will also be understood from the aforegoing that the invention provides a highly flexible system which has no limitations regarding structural design, the number of people using the system, schedules, memory storage volumes, etc. The installation costs are restricted to a minimum, the expansion costs regarding the number of people using the system are limited to the information carriers, the structural expansion costs are limited to the stamping/calculating units. The system/operational maintenance is limited to a mutual exchange of stamping/calculating units and information carriers.

Although the invention has been described with reference to a particular embodiment thereof, it will be understood that other embodiments and minor changes are conceivable without departing from the inventive concept.

The term monitoring shall be given a wide interpretation and is intended to include monitoring, checking and pure registration of the individuals using the system.

In addition to the aforementioned applications, the invention cab also be advantageously applied to other types of systems, such as lunch clocking systems in which individual lunches are registered and billed, manufacturing systems in which the manufacture of given products is registered, etc., car parking systems, automatic goods dispensing systems, etc.

As before mentioned, the updatable information carriers may be of mutually different types. Examples in this respect are smart cards, contactless techniques based on microwaves for instance, memory cards in the form of date-carrying cards, keys, tags or the like, magnetic cards, magnetic tapes, diskettes, optical discs, and so on.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A monitoring method, including individual attendance data, in which individuals make contact with an information exchange unit and supply information to said unit, in which unit said information is compiled, the method comprising: arranging existing information exchange units (2,3) in a decentralized system in which each said unit (2,3) may be separated physically from remaining units; providing that each individual carries an updatable information carrier (4) which includes unique information personal to said each individual; and effecting updating of the information carrier by contact with said information exchange unit, providing and enabling the information carrier to carry additional information, intended to be supplied to an information exchange unit; and further comprising reading the information carried by the information carrier (4) by means of a read unit (3') for central processing at desired points in time.

2. A monitoring method as defined in claim 1, wherein said additional information intended to be supplied to an information exchange unit is information suited for passage control purposes.

3. A method according to claim 1, further comprising carrying the information on a readable and writable data medium (4), selected from a group of data medium consisting of at least a smart card, a tag, and a key.

4. A method according to claim 1, further comprising, in appropriate cases, causing contact by an individual with an information exchange unit (2) to result in the processing of desired information by means of a calculating unit (16) belonging to said information exchange unit.

5. A method according to claim 1, further comprising the step of carrying by the information carrier (4) of individual attendance data which is updated upon contact of said information carrier with an information exchange unit (2), as the individual concerned comes and goes.

6. A monitoring method, including individual attendance data, in which individuals make contact with an information exchange unit and supply information to said unit, in which unit said information is compiled, the method comprising: arranging existing information exchange units (2,3) in a decentralized system in which each said unit (2,3) may be separated physically from remaining units; providing that each individual carries an updatable information carrier (4) which includes unique information personal to said each individual; and effecting updating of the information carrier by contact with said information exchange unit, providing and enabling the information carrier to carry additional information, intended to be supplied to an information exchange unit; wherein existing information exchange units (2) are arranged in a decentralized system, which forms part of a centralized system (7); and causing the information carrier (4) to be influenced upon contact with the centralized system (7) and therewith adapted to the decentralized system (1).

7. A monitoring method as defined in claim 6, wherein said additional information intended to be supplied to an information exchange unit is information suited for passage control purposes.

8. A method according to claim 6, further comprising causing the centralized system (7) and also the decentralized system (1) to include passage control, wherein a boundary structure is included in the centralized system and including at least one decentralized systems arranged in connection with the boundary structure.

9. A monitoring system comprising: at least one information exchange unit to which information is supplied by individuals by contact with the information exchange unit, and which system also includes devices for compiling such information, and including existing information exchange units (2) arranged in a decentralized system (1), in which each information exchange unit (2, 3) may be independent from and separated physically from remaining information exchange units (2, 3) in the system; wherein the system also includes individual updatable information carriers (4) by means of which respective individuals carry attendance information which is unique to the individual concerned; wherein updating of the information carried by the information carrier is effected upon contact with a information exchange unit (2) which is intended to perform said updating and wherein the information carrier is intended to carry additional information; further comprising means including a read unit (3') for reading information carried by an information carrier to enable central processing of that information.

10. A monitoring system as defined in claim wherein said information carrier carries additional information suited for passage control purposes.

11. A system according to claim 9, wherein the information carrier (4) has the form of a readable and writable data medium (4), selected from a group of such medium consisting of at least a smart card, a tag, and a key.

12. A system according to claim 9, wherein a calculating unit (6) is provided in an information exchange unit (2) to process desired information, upon an individual making contact with the information exchange unit through the intermediary of an information carrier.

13. A system according to claim 9, wherein the information carrier (4) is adapted to carry individual attendance information and is further adapted to be updated by means of an information exchange unit (2) upon an individual making contact through his information carrier with the information exchange unit as the individual comes and goes.

14. A monitoring system comprising: at least one information exchange unit to which information is supplied by individuals by contact with the information exchange unit, and which system also includes devices for compiling such information, and including existing information exchange units (2) arranged in a decentralized system (1), in which each information exchange unit (2, 3) may be independent from and separated physically from remaining information exchange units (2, 3) in the system; wherein the system also includes individual updatable information carriers (4) by means of which respective individuals carry attendance information which is unique to the individual concerned; wherein updating of the information carried by the information carrier is effected upon contact with a information exchange unit (2) which is intended to perform said updating and wherein the information carrier is intended to carry additional information; and further comprising a centralized system, and said decentralized system (1) and said at least one information exchange unit (2) form part of said centralized system (7), and said centralized system is adapted to influence the information carried by an information carrier as desired by the individual who has the information carrier.

15. A monitoring system as defined in claim 14, wherein said information carrier carries additional information suited for passage control purposes.

16. A system according to claim 14, wherein the centralized system (7) and also the decentralized system (1) are intended for passage control purposes, and wherein the centralized system includes a boundary structure and wherein at least one decentralized system is arranged in connection with the the boundary structure.

* * * * *

UNITED STATES PATENT AND TRADEMARK OFFICE

CERTIFICATE OF CORRECTION

PATENT NO. : 5,459,305

DATED : October 17, 1995

INVENTOR(S) : LENNART ERIKSSON

It is certified that error appears in the above-identified patent and that said Letters Patent is hereby corrected as shown below:

At column 6, line 6, (Claim 10, line 1), after "claim" insert --9--.

Signed and Sealed this

Twelfth Day of December, 1995

Attest:

Bruce Lehman

BRUCE LEHMAN

*Attesting Officer*

*Commissioner of Patents and Trademarks*